(12) United States Patent
Fernandez Alonso et al.

(10) Patent No.: US 8,843,992 B2
(45) Date of Patent: Sep. 23, 2014

(54) METHOD, APPARATUSES AND COMPUTER PROGRAM FOR DYNAMICALLY CONFIGURING A PROXY CALL SESSION CONTROL FUNCTION OF THE IP MULTIMEDIA SUBSYSTEM FROM A POLICY CONTROL RULES SERVER

(75) Inventors: Susana Fernandez Alonso, Madrid (ES); David Castellanos Zamora, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 597 days.

(21) Appl. No.: 12/600,693

(22) PCT Filed: May 22, 2007

(86) PCT No.: PCT/EP2007/054964
§ 371 (c)(1),
(2), (4) Date: Nov. 18, 2009

(87) PCT Pub. No.: WO2008/141675
PCT Pub. Date: Nov. 27, 2008

(65) Prior Publication Data
US 2010/0154029 A1    Jun. 17, 2010

(51) Int. Cl.
*G06F 17/00* (2006.01)
*H04L 29/06* (2006.01)

(52) U.S. Cl.
CPC ...... *H04L 29/06027* (2013.01); *H04L 65/1016* (2013.01)
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 7,961,714 B1 * | 6/2011 | Watson et al. | 370/352 |
| 8,331,229 B1 * | 12/2012 | Hu et al. | 370/230 |
| 2002/0036983 A1 * | 3/2002 | Widegren et al. | 370/230.1 |
| 2002/0151312 A1 * | 10/2002 | Rosemarijn Bos et al. | 455/452 |
| 2003/0027595 A1 * | 2/2003 | Ejzak | 455/560 |
| 2004/0028055 A1 * | 2/2004 | Madour et al. | 370/395.21 |
| 2004/0187021 A1 * | 9/2004 | Rasanen | 713/200 |
| 2004/0223489 A1 * | 11/2004 | Rotsten et al. | 370/352 |
| 2004/0229596 A1 * | 11/2004 | Stura et al. | 455/406 |
| 2004/0240399 A1 * | 12/2004 | Corrao et al. | 370/260 |
| 2005/0025047 A1 * | 2/2005 | Bodin et al. | 370/229 |

(Continued)

OTHER PUBLICATIONS

"3GPP TS 29.208 v6.6.1 Technical Specification, Release 6," 3rd Generation Partnership Project, Mar. 2006.*

(Continued)

*Primary Examiner* — Darren B Schwartz

(57) ABSTRACT

The present invention faces the problem of network scenarios where there is no user differentiation, and where sessions established through an IP Multimedia Subsystem always proceed in the same way regardless user categories and regardless whether a user has accessed through a fixed or a mobile network. To this end, the present invention provides for a new method for dynamically configuring a Proxy Call Session Control Function of the IP Multimedia Subsystem from a Policy Control Rules server responsible for installing control rules to authorize media flows at an entity in the bearer layer. This entity in the bearer layer may be a Policy and Charging Enforcement Point of a PCC architecture, whereas the Policy Control Rules server may be a Policy and Charging Control Rules of the PCC architecture.

24 Claims, 10 Drawing Sheets

(56) References Cited

U.S. PATENT DOCUMENTS

| | | | |
|---|---|---|---|
| 2005/0085247 A1* | 4/2005 | Bajko et al. | 455/466 |
| 2005/0213580 A1* | 9/2005 | Mayer et al. | 370/395.2 |
| 2006/0271693 A1* | 11/2006 | Thiebaut et al. | 709/229 |
| 2007/0027975 A1* | 2/2007 | Tai et al. | 709/223 |
| 2007/0053361 A1* | 3/2007 | Chen et al. | 370/392 |
| 2007/0118881 A1* | 5/2007 | Mitchell et al. | 726/4 |
| 2007/0130471 A1* | 6/2007 | Walker Pina et al. | 713/182 |
| 2007/0190990 A1* | 8/2007 | Yin | 455/414.3 |
| 2007/0207805 A1* | 9/2007 | Pallares Lopez et al. | 455/436 |
| 2007/0211694 A1* | 9/2007 | Rasanen | 370/352 |
| 2007/0213078 A1* | 9/2007 | Shaheen | 455/466 |
| 2007/0281699 A1* | 12/2007 | Rasanen | 455/436 |
| 2008/0046963 A1* | 2/2008 | Grayson et al. | 726/1 |
| 2008/0229385 A1* | 9/2008 | Feder et al. | 726/1 |
| 2009/0290573 A1* | 11/2009 | Belling et al. | 370/352 |

OTHER PUBLICATIONS

"3GPP TS 29.209 v6.6.0 Technical Specification, Release 6," 3rd Generation Partnership Project, Jun. 2006.*

3GPP, "Technical specification Group Core Network and Terminals; Policy control over Gq interface (Release 6)", 3GPP TS 29.209 Version 6.6.0, Sep. 2006.*

"Policy and Charging Control Over R Reference Point", 3GPP TS 29.214 v7.0.0 (Mar. 2007).

29.214 CR 012, 3GPP TSG-CT WG3 Meeting #44, Beijing, China, May 7-11, 2007 XP-002474010.

* cited by examiner

METHOD, APPARATUSES AND COMPUTER PROGRAM FOR DYNAMICALLY CONFIGURING A PROXY CALL SESSION CONTROL FUNCTION OF THE IP MULTIMEDIA SUBSYSTEM FROM A POLICY CONTROL RULES SERVER

TECHNICAL FIELD

The present invention generally relates to new and enhanced functionality of entities of a so-called Policy and Charging Control architecture. More specifically, the present invention relates to dynamic configuration of a Call Session Control Function server of an IP Multimedia Subsystem.

BACKGROUND

Nowadays, the IP Multimedia Subsystem (hereinafter IMS) enables network operators to offer their subscribers multimedia services based on, and built upon, Internet applications, services and protocols. The IMS architecture offers the opportunity to deploy peer-to-peer applications where two or more users directly exchange user data upon a session establishment via IMS. In this respect, different IMS services and applications as defined by 3GPP and OMA standards can be offered on top of the IMS. Some exemplary peer-to-peer applications may be Multimedia Telephony, Push to Talk over Cellular, streaming, real-time video sharing, file sharing, and gaming.

On the other hand, and in order to provide a satisfactory and reliable service experience, network operators need to take a special care of the quality of service (hereinafter QoS), effective charging and potential fraud on the usage of services. To this end, 3GPP standards provide for a so-called Policy and Charging Control (hereinafter PCC) architecture to help network operators to control the above issues. The PCC architecture basically consists of an Application Function (hereinafter AF) offering applications requiring a dynamic policy and/or charging control of traffic plane resources, a Policy and Charging Enforcement Function (hereinafter PCEF) providing control over the user plane traffic and its QoS, and a Policy and Charging Rules Function (hereinafter PCRF) responsible for installing required PCC rules at the PCEF to ensure that only authorized media flows associated to requested services are allowed and are applied, for example, the right bandwidth, charging and priority.

In accordance with 3GPP standards, communications between IMS subscribers and IMS entities, as well as between IMS entities themselves, are carried out with a so-called Session Initiation Protocol (hereinafter SIP) for signalling multimedia sessions, and with a Session Description Protocol (hereinafter SDP) for exchanging information about media flows associated with the multimedia sessions. More specifically, transport connections may be dynamically negotiated with help of the above SIP and SDP protocols between two end-points, or between two IMS peer-to-peer applications. In this respect, 3GPP TS 23.203 proposes the above PCC architecture to effectively support the IMS peer-to-peer applications with a first mechanism to selectively control IP flows associated with IMS sessions of a subscriber, and a second mechanism to selectively determine the bearer usage of dynamically negotiated IP flows in order to apply an effective policy and charging for each service.

A complete solution for the support of IMS services and applications includes user equipments (hereinafter UE), IP-Connectivity Access Networks (hereinafter IP-CAN), and specific functional elements of the IMS, namely IMS entities as described in 3GPP TS 23.228 "IP Multimedia Subsystem (IMS); Stage 2". An exemplary IP-Connectivity Access Network is the GPRS core network with GERAN and/or UTRAN radio access networks.

A traditional scenario may be where IMS services and applications are offered over a GPRS connection, that is, where GPRS is the IP-CAN. In this scenario, a Proxy Call Session Control Function (hereinafter P-CSCF) server acting as entry node in the IMS architecture may include the AF functionality and is located in the signalling plane; a Gateway GPRS Support Node (hereinafter GGSN) may include the PCEF functionality and is located in the bearer plane; whereas the PCRF may sit between the signalling plane and the bearer plane, thus being connected with the P-CSCF and the GGSN.

In a conventional IMS network, multiple factors may make the P-CSCF behave in a different way. For example, the P-CSCF might have to decide: payload types to be accepted, maximum number of media components to be accepted per media type, codecs supported, bandwidth permitted per media type, etc; and these decisions can be taken in the P-CSCF based on information received from a UE. This situation may lead to inconsistencies in the case of a split UE, for example, where a mobile phone connects a Personal Computer with an IP-CAN, since a consistent UE behaviour cannot be guaranteed at the time of initiating the establishment of SIP sessions. In this scenario, a conventional P-CSCF is statically configured in accordance with preferences of the owning network operator and regardless specific conditions that could appear. A P-CSCF thus statically configured always behaves in the same way, regardless specific conditions that could appear.

In addition, where PCC comes into place, more data have to be configured in the P-CSCF in order to stipulate interactions with the PCC architecture during the SIP session establishment and how to progress it, what information shall be provided to the PCC architecture, and what information shall be received from the PCC architecture, amongst others. As in the above case where a PCC architecture is not connected with the IMS, all these behaviours can be statically configured in the P-CSCF so that no specific condition can be distinguished from an operational point of view.

Moreover, currently existing networks are evolving towards so-called fixed-mobile-convergence networks, where the user can make use of IMS services from different accesses with different technologies. Besides, network operators promote different user categories, with different tariffs and available services. In order to cope with all these requirements, the IMS network needs to be adapted to work in the most optimal way for every user and at every access.

Static configurations for handling IMS sessions imply strong limitations to the above network scenarios where there is no user differentiation, and where IMS sessions always proceed in the same way regardless user categories and regardless whether a user has accessed through a fixed or a mobile network.

SUMMARY

The present invention is aimed to obviate at least some of the above disadvantages and provides for a method for dynamically configuring a P-CSCF from a Policy Control Rules server, a P-CSCF for allowing a user to access an IMS network, and a Policy Control Rules server responsible for installing control rules to authorize media flows at an entity in the bearer layer. This entity in the bearer layer may be a GGSN or a PDG including a PCEF, or the PCEF itself.

Thus, in accordance with a first aspect of the present invention, there is provided a method for dynamically configuring a P-CSCF from a Policy Control Rules server, the P-CSCF allowing a user to access IMS whereas the Policy Control Rules server is responsible for installing control rules to authorize media flows at an entity in the bearer layer. This method comprises a step of establishing a session through an IP-connectivity access network "IP-CAN"; a step of registering an originating user with the IMS; a step of requesting from the P-CSCF configuration data towards the Policy Control Rules server; a step of applying policies at the Policy Control Rules server in order to determine configuration data for the session; and a step of submitting from the Policy Control Rules server towards the P-CSCF said configuration data.

This method may be advantageously used where the step of submitting configuration data includes a step of selecting configuration data from a group of configuration data that includes: indication of a signalling procedure during which a further contact with the Policy Control Rules server is required; indication to modify or reject service information in transit based on access-related user information; indication to provide a specific service information element to the Policy Control Rules server usable for policy decisions; and information about access type of an IP connectivity access network "IP-CAN" where the user accesses the IMS through.

In particular, and in order to be compatible with current 3GPP specifications, this method may be applied where SIP is used for initiating and signalling multimedia sessions established by the user with the IMS, and SDP is used to receive information about the media flows associated with the multimedia sessions. Thus, where these protocols are used between IMS entities, the above method may be advantageously carried out where the above indication of a signalling procedure to further contact with the Policy Control Rules server, submitted towards the P-CSCF, is provided with a parameter value, a so-called '[PCC-required]' in the instant specification, in an attribute value pair "AVP", and wherein this parameter value is selected from a group of values that includes: a so-called "SDP-offer" to indicate a contact at reception of both SDP-offer and a SDP-answer; and a so-called "SDP-answer" to indicate a contact at reception of a SDP-answer.

Likewise, the above method may be advantageously carried out where the above indication to modify or reject service information in transit based on access-related user information, submitted towards the P-CSCF, is provided with a parameter value, a so-called '[SDP-negotiation]' in the instant specification, in an attribute value pair "AVP", the parameter value selected from a group of values that includes: "Cancel/Terminate" to indicate no negotiation of SDP and, upon detection of problems, the SDP session to be cancelled or terminated; "Reject" to indicate negotiation of new conditions with the user equipment, where there are not enough resources or where the service conditions are not acceptable by the Policy Control Rules server; and "Alter" to indicate alteration of an SDP offer in progress with a set of allowed SDP parameters, where the service conditions are not acceptable by the Policy Control Rules server.

Moreover, the above method may also be advantageously carried out where the above indication to provide a specific service information element to the Policy Control Rules server usable for policy decisions, submitted towards the P-CSCF, is provided with a parameter value, a so-called '[SDP-info]' in the instant specification, in an attribute value pair "AVP", the parameter value including a list of SDP lines to be further provided towards the Policy Control Rules server for the given user within a so-called "Codec-Data" AVP.

Furthermore, the above method may also be advantageously carried out where the above information about access type of an IP connectivity access network "IP-CAN" where the user accesses the IMS through, submitted towards the P-CSCF, is provided with a parameter value, a so-called '[IP-CAN-type]' in the instant specification, in an attribute value pair "AVP", the parameter value selected from a group of values that includes: "GPRS"; and "WLAN".

For practical reasons, and for additional advantages, the above method may further comprise a step of storing received configuration data; and a step of applying the configuration data to signalling sessions established by the user whilst the user is registered in the IMS. Regarding further improvements where a huge number of subscribers are foreseen, the above method may further comprise a step of deleting the configuration data from storage once the user becomes unregistered.

On the other hand, and regarding how configuration data are determined at the Policy Control Rules server, the above method may be implemented so that the step of applying policies to determine configuration data includes a step of deriving configuration from at least one element selected from a group of elements comprising: IP-CAN access type; Bearer Control Mode for the IP-CAN session; Subscriber category; Roaming status; Terminal Type; and Specific operator policies.

Moreover, and in order to be compatible with current 3GPP specifications in respect of scenarios where a PCC architecture assists an IMS network, the above method may further comprise a step of generating control rules at the Policy Control Rules server to be installed at an entity in the bearer layer; and a step of authorizing a session towards the P-CSCF. As before, this entity in the bearer layer may be a GGSN or a PDG including a PCEF, or the PCEF itself.

In accordance with a second aspect of the present invention, there is provided a Policy Control Rules server for generating control rules based on service information received from application devices and for installing said control rules at an entity in the bearer layer; wherein said entity in the bearer layer may be a GGSN or a PDG including a PCEF, or the PCEF itself. This Policy Control Rules server comprises first communication means for communicating with the entity in the bearer layer to install control rules; second communication means for communicating with a P-CSCF where a user accesses the IMS; a configuration requester input for receiving a request for configuration data from the P-CSCF; and a configuration data sender for submitting configuration data towards the P-CSCF.

Accordingly with an advantageous embodiment of the above method, the configuration data sender in this Policy Control Rules server may be adapted for submitting towards the P-CSCF configuration data selected from a group of configuration data that includes: indication of a signalling procedure during which a further contact with the Policy Control Rules server is required; indication to modify or reject service information in transit based on access-related user information; indication to provide a specific service information element to the Policy Control Rules server usable for policy decisions; and information about access type of an IP connectivity access network "IP-CAN" where the user accesses the IMS through.

Also in accordance with a first advantageous embodiment of the above method, the Policy Control Rules server may be adapted so that the indication of a signalling procedure to further contact with the Policy Control Rules server is submitted towards the P-CSCF with a parameter value, a so-called '[PCC-required]' in the instant specification, in an attribute value pair "AVP", the parameter value selected from a group of values that includes: indication to contact at reception of both Session Description Protocol "SDP" offer and Session Description Protocol "SDP" answer; and indication to contact at reception of a Session Description Protocol "SDP" answer.

Likewise, and also in accordance with a second advantageous embodiment of the above method, the Policy Control Rules server may be adapted so that the indication to modify or reject service information in transit based on access-related user information is submitted towards the P-CSCF with a parameter value, a so-called '[SDP-negotiation]' in the instant specification, in an attribute value pair "AVP", the parameter value selected from a group of values that includes: "Cancel/Terminate" to indicate no negotiation of Session Description Protocol "SDP" and, upon detection of problems, the SDP session to be cancelled or terminated; "Reject" to indicate negotiation of new conditions with the user equipment, where there are not enough resources or where the service conditions are not acceptable by the Policy Control Rules server; and "Alter" to indicate alteration of an SDP offer in progress with a set of allowed SDP parameters, where the service conditions are not acceptable by the Policy Control Rules server.

Moreover, and also in accordance with a third advantageous embodiment of the above method, the Policy Control Rules server may be adapted so that the indication to provide a specific service information element to the Policy Control Rules server usable for policy decisions is submitted towards the P-CSCF with a parameter value, a so-called '[SDP-info]' in the instant specification, in an attribute value pair "AVP", the parameter value including a list of Session Description Protocol "SDP" lines to be further provided towards the Policy Control Rules server for the given user within a so-called "Codec-Data" AVP.

Furthermore, and also in accordance with a fourth advantageous embodiment of the above method, the Policy Control Rules server may be adapted so that the information about access type of an IP connectivity access network "IP-CAN" where the user accesses the IMS through is submitted towards the P-CSCF with a parameter value, a so-called '[IP-CAN-type]' in the instant specification, in an attribute value pair "AVP", the parameter value selected from a group of values that includes: "GPRS"; and "WLAN".

Regarding the configuration data to be submitted towards the P-CSCF, The Policy Control Rules may further comprise a processor enabled to derive configuration data from at least one element selected from a group of elements comprising: IP-CAN access type; Bearer Control Mode for the IP-CAN session; Subscriber category; Roaming status; Terminal Type; and Specific operator policies. In particular, the processor of this Policy Control Rules server may cooperate with a configuration unit specifically dedicated for deriving said configuration data.

Regarding compatibility with current 3GPP specifications in respect of those scenarios where the PCC architecture assists the IMS network, the above Policy Control Rules server may further comprise a rules generator for generating control rules to be installed at the entity in the bearer layer, and an authorizer for authorizing a session towards the P-CSCF, both likely in cooperation with a storage for storing parameters that may be included in said control rules as well as sessions identifiers. In particular, the entity in the bearer layer may include a PCEF of a PCC architecture; and the Policy Control Rules server may be arranged for installing the control rules, as well as instructions to uninstall previously installed control rules, with help of the first communication means.

In accordance with a second aspect of the present invention, there is provided a P-CSCF for allowing a user to access an IMS network offering multimedia services to the user. This P-CSCF comprises: first communication means for communicating with the user and with other entities of the IMS; second communication means for communicating with a Policy Control Rules server responsible for installing control rules to authorize media flows at an entity in the bearer layer; a configuration requester output for requesting configuration data from the Policy Control Rules server; and a configuration data receiver for receiving configuration data from the Policy Control Rules server. In operation, the configuration requester output of the P-CSCF may be responsive to receiving an initial registration from the user in the IMS through the first communication means.

Accordingly with an advantageous embodiment of the above method, and aligned with an advantageous embodiment of the Policy Control Rules server, the configuration data receiver of the P-CSCF may be adapted for receiving from the Policy Control Rules server configuration data selected from a group of configuration data that includes: indication of a signalling procedure during which a further contact with the Policy Control Rules server is required; indication to modify or reject service information in transit based on access-related user information; indication to provide a specific service information element to the Policy Control Rules server usable for policy decisions; and information about access type of an IP connectivity access network "IP-CAN" where the user accesses the IMS through.

Additional advantages may be appreciated as configuring the P-CSCF from the Policy Control Rules server. To this end, the P-CSCF may further comprise a storage for storing the received configuration data; and a processor for applying the configuration data to signalling sessions established by the user whilst the user is registered in the IMS, and for deleting the configuration data from storage once the user becomes unregistered.

Regarding compatibility with current 3GPP specifications, and aligned with corresponding technical features in the above method, the first communication means of the P-CSCF are arranged for supporting and using SIP for initiating and signalling multimedia sessions established by the user with the IMS, and for supporting and using SDP to receive information about the media flows associated with the multimedia sessions.

Thus, where these protocols are used between IMS entities and in accordance with a first advantageous embodiment of the above method, the P-CSCF may be adapted so that the indication of a signalling procedure to further contact with the Policy Control Rules server is provided with a parameter value, a so-called '[PCC-required]' in the instant specification, in an attribute value pair "AVP", the parameter value selected from a group of values that includes: "SDP-offer" to indicate a contact at reception of both SDP-offer and a SDP-answer; and "SDP-answer" to indicate a contact at reception of a SDP-answer.

Following this rationale, where SIP and SDP are used between IMS entities and in accordance with a second advantageous embodiment of the above method, the P-CSCF may be adapted so that the indication to modify or reject service information in transit based on access-related user information is provided with a parameter value, a so-called '[SDP-negotiation]' in the instant specification, in an attribute value pair "AVP", the parameter value selected from a group of values that includes: "Cancel/Terminate" to indicate no negotiation of SDP and, upon detection of problems, the SDP session to be cancelled or terminated; "Reject" to indicate negotiation of new conditions with the user equipment, where there are not enough resources or where the service conditions are not acceptable by the Policy Control Rules server; and "Alter" to indicate alteration of an SDP offer in progress with a set of allowed SDP parameters, where the service conditions are not acceptable by the Policy Control Rules server.

Moreover, where SIP and SDP are used between IMS entities and in accordance with a third advantageous embodiment of the above method, the P-CSCF may be adapted so that the indication to provide a specific service information element to the Policy Control Rules server usable for policy decisions is provided with a parameter value, a so-called '[SDP-info]' in the instant specification, in an attribute value pair "AVP", the parameter value including a list of SDP lines to be further provided towards the Policy Control Rules server for the given user within a so-called "Codec-Data" AVP.

Furthermore, where SIP and SDP are used between IMS entities and in accordance with a fourth advantageous embodiment of the above method, the P-CSCF may be adapted so that the information about access type of an IP connectivity access network "IP-CAN" where the user accesses the IMS through is provided with a parameter value, a so-called '[IP-CAN-type]' in the instant specification, in an attribute value pair "AVP", the parameter value selected from a group of values that includes: "GPRS" and "WLAN".

In an embodiment of the invention, the above group of selectable configuration data may optionally include a specific set of policies generated by the Policy Control Rules server based on the type of IP-CAN and likely other user related information, and to be executed by the P-CSCF. To this end, the configuration unit cooperates with the processor of the Policy Control Rules server for generating this set of policies based on the type of IP-CAN and likely other user related information.

The invention may be practised by a computer program, which is loadable into an internal memory of a computer with input and output units as well as with a processing unit; the computer program comprises executable software, which may be separable in different portions, adapted to carry out the above method steps in the above different entities, servers or devices, when running in a number of computers. In particular, the executable software, or portions thereof, may be recorded in a carrier readable medium.

BRIEF DESCRIPTION OF THE DRAWINGS

The features, objects and advantages of the invention will become apparent by reading this description in conjunction with the accompanying drawings, in which.

DETAILED DESCRIPTION

The following describes some preferred embodiments for a PCC architecture dynamically configuring a Proxy Call Session Control Function of an IMS network.

Figure 1:
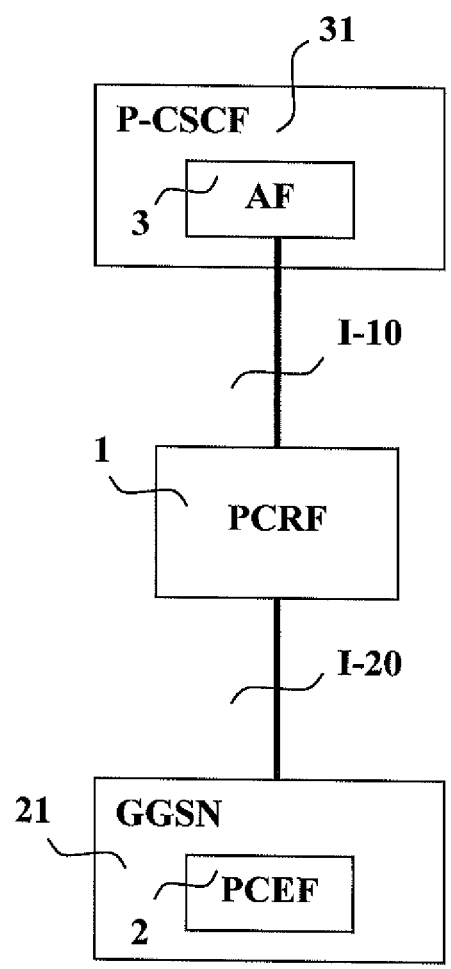
FIG. 1 is a basic block diagram illustrating how different entities of a PCC architecture cooperate with a P-CSCF of an IMS network and with a GGSN of GPRS access network.
Figure 2:
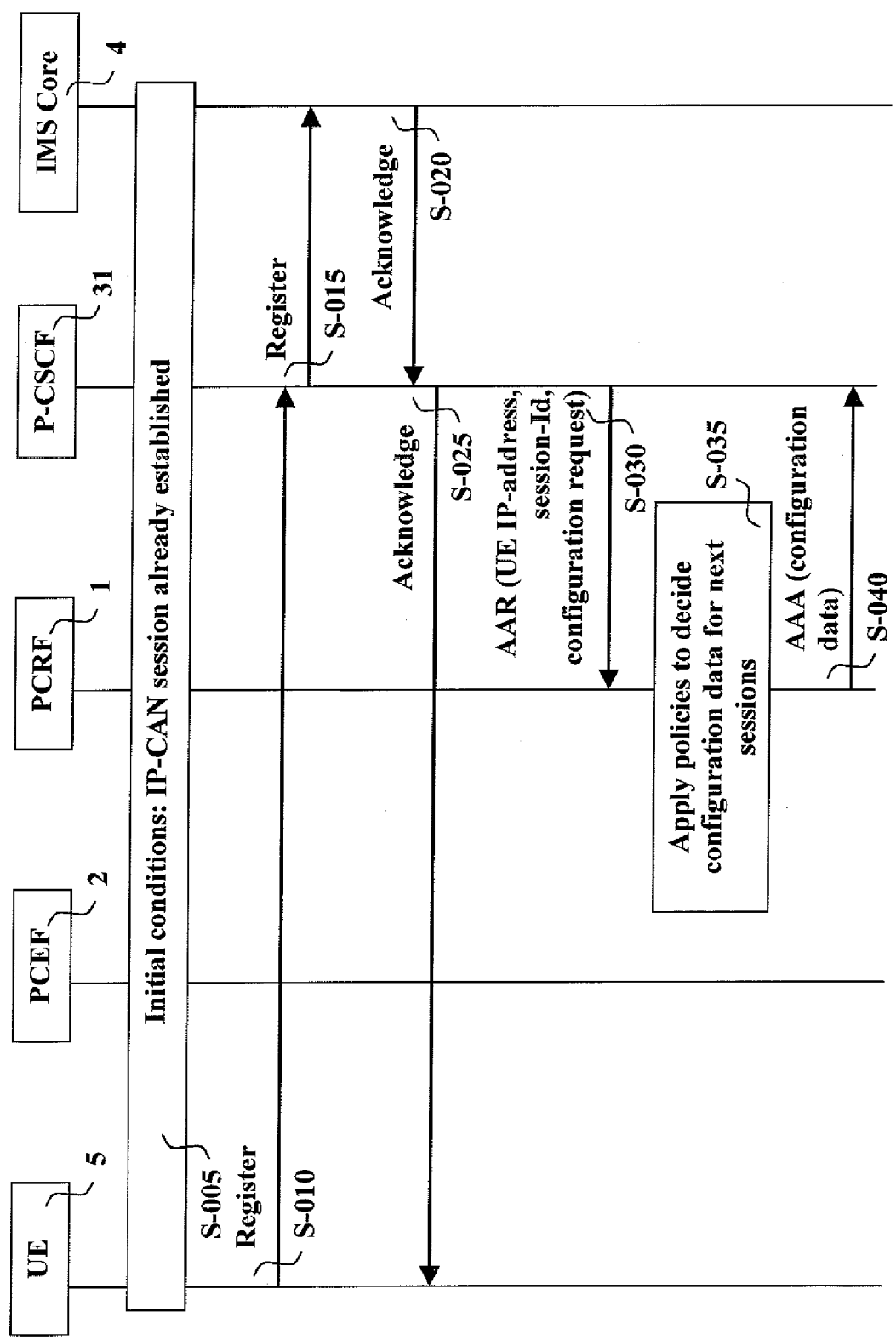
FIG. 2 illustrates a sequence diagram of an exemplary method usable to dynamically configure a P-CSCF from the PCC architecture.
Figure 6:
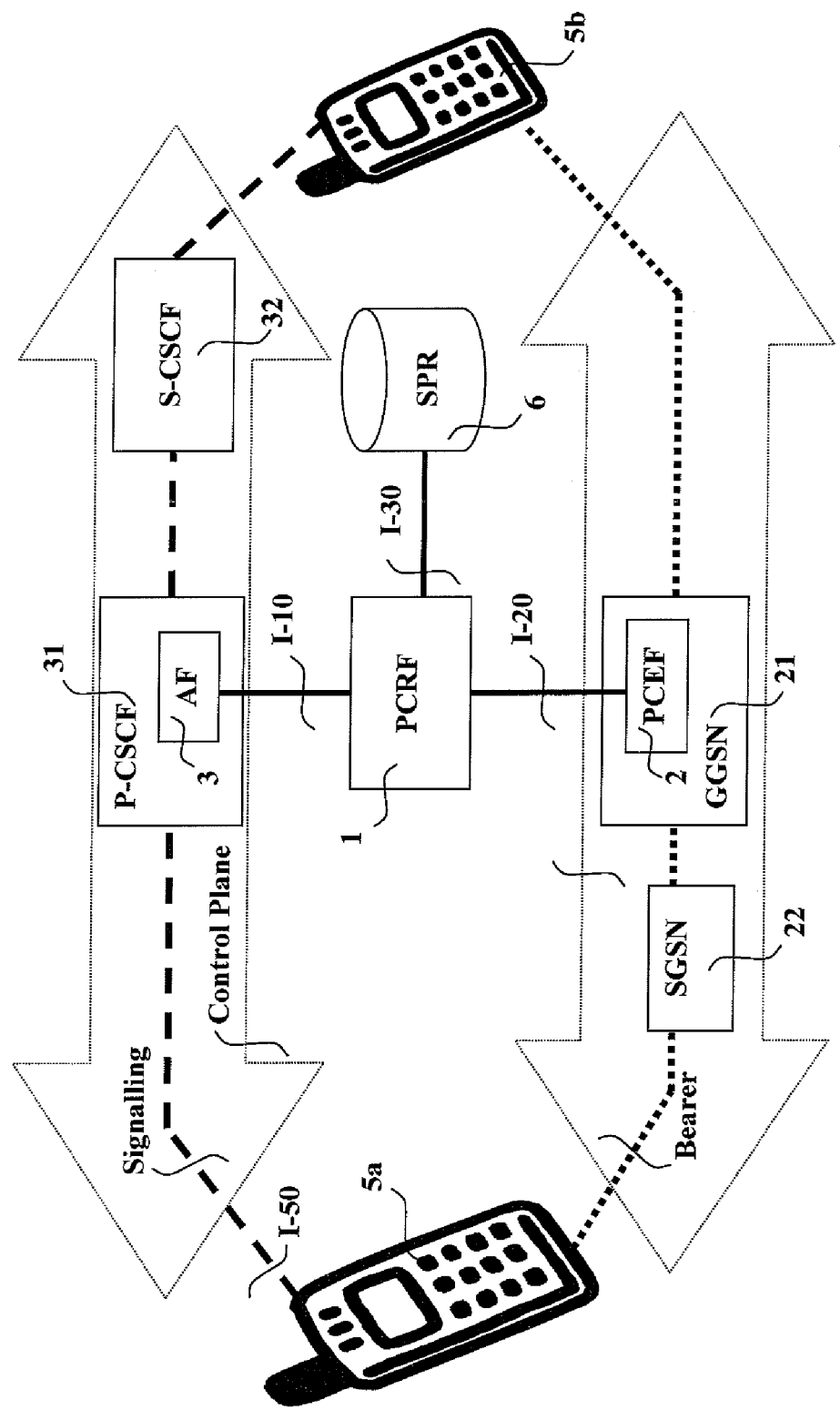
FIG. 6 is a basic block diagram illustrating how the invention fits in a first scenario following a PCC model, where requirements on QoS are negotiated through an IMS signalling layer whilst services are carried on a bearer layer provided by a GPRS access network.
Figure 7:
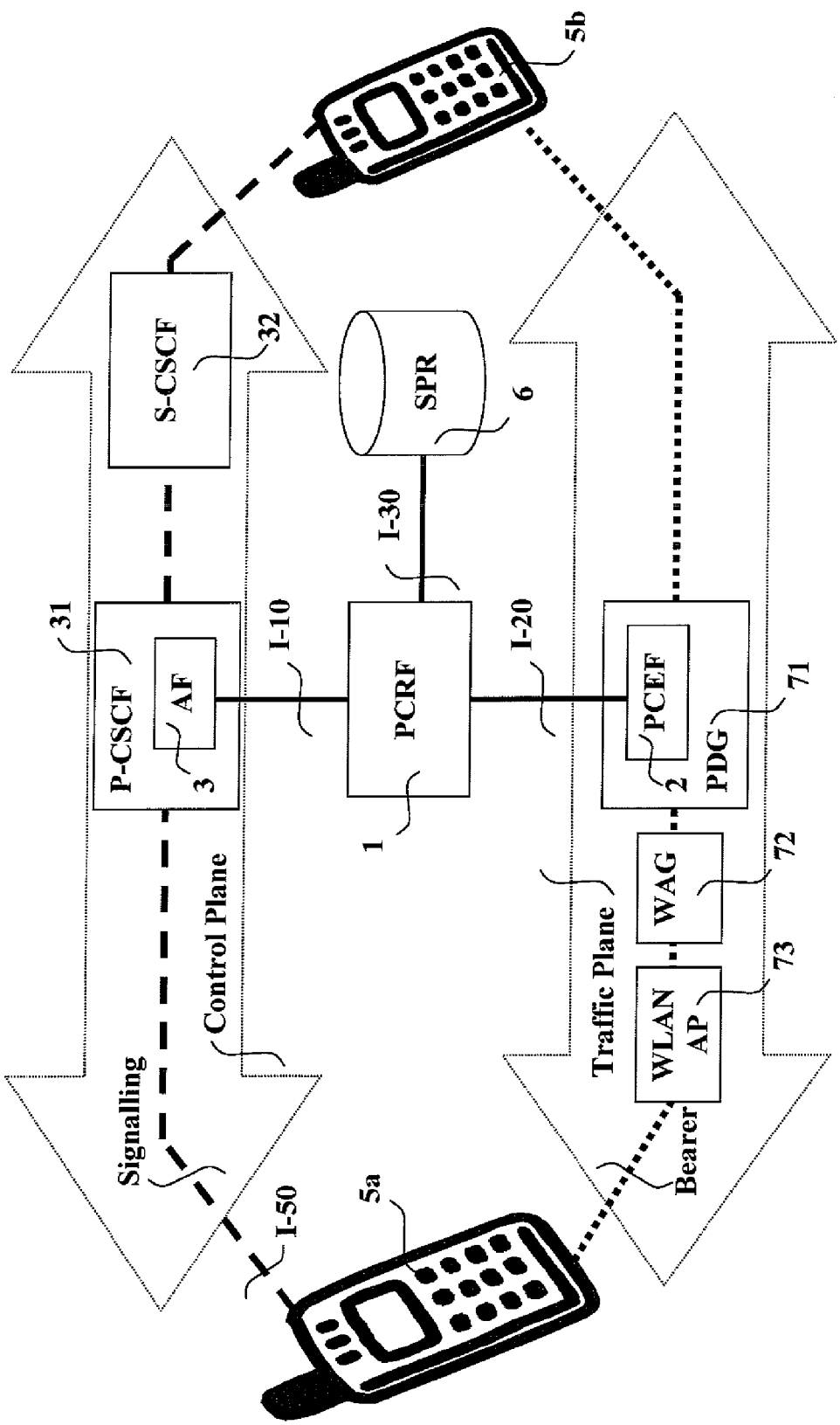
FIG. 7 is a basic block diagram illustrating how the invention fits in a second scenario following a PCC model, where requirements on QoS are negotiated through an IMS signalling layer whilst services are carried on a bearer layer provided by a WLAN access network.

Thus, FIG. 2 illustrates an exemplary embodiment of a method for a dynamic configuration of a P-CSCF to further allow an operational distinction based on user categories and access network. The method assumes the establishment of an IP-CAN session as an initial condition carried out during a previous step S-005. This IP-CAN session might have been established, for example, through a GGSN 21 where the IP-CAN is a GPRS access network, as illustrated in FIG. 6; or, for example, through a Packet Data Gateway 71 (hereinafter PDG) where the IP-CAN is a Wireless Local Area Network (WLAN), as illustrated in FIG. 7. Such GGSN or PDG may include the PCEF 2 of the PCC architecture shown in FIG. 1 or may be adapted to cooperate with a separate PCEF.

Figure 5:
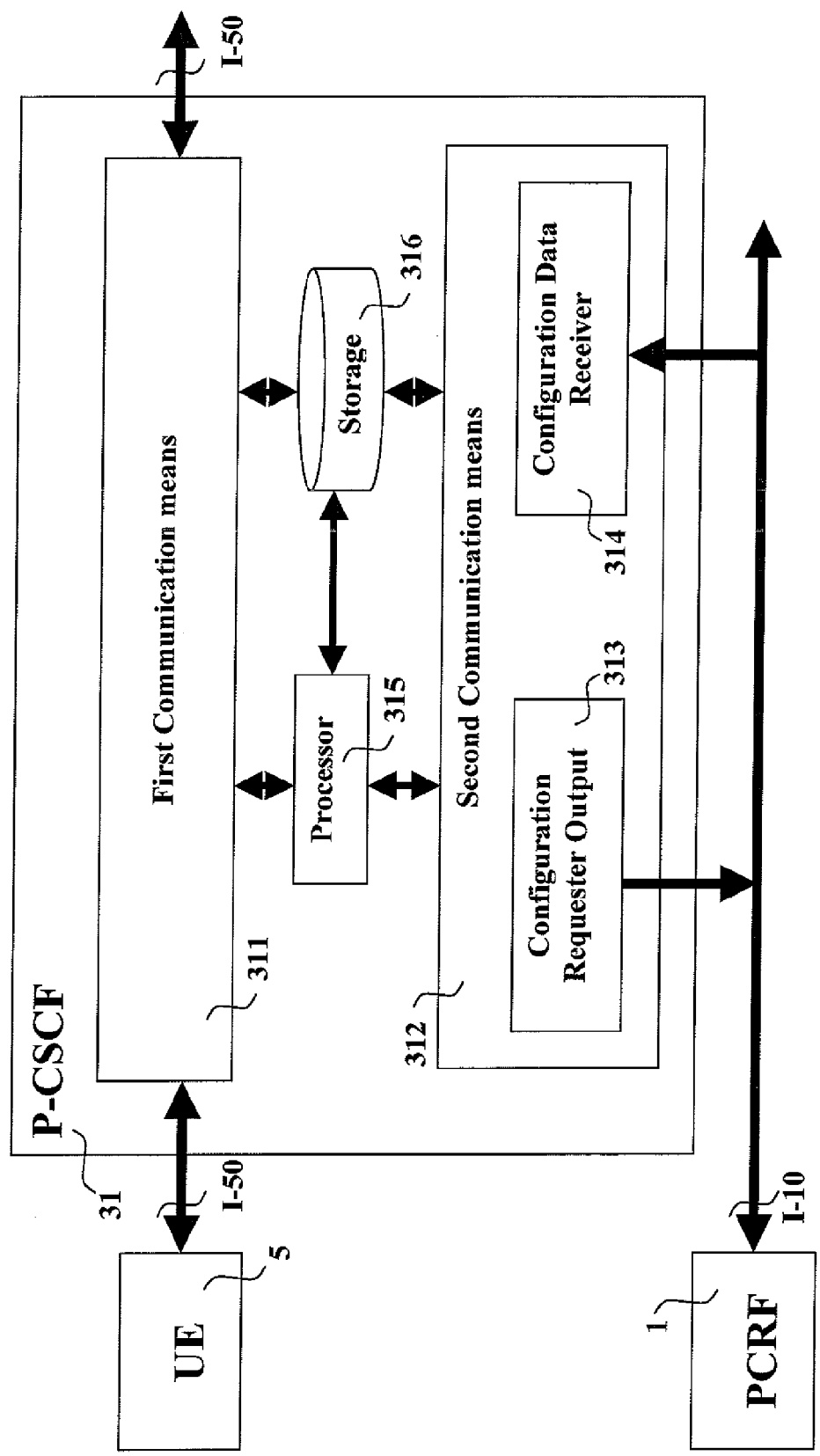
FIG. 5 is a basic block structure presenting the structural elements that a Proxy Call Session Control Function may comprise in accordance with several embodiments of the invention.

The method in FIG. 2 starts where a user with a UE 5 registers in the IMS network during a step S-010. This registration is received in a P-CSCF 31, which may include the AF 3 of the PCC architecture shown in FIG. 1 or may be adapted to cooperate with a separate AF, and is forwarded in a step S-015 towards the IMS core 4. The registration process goes on through entities of the IMS core 4 in accordance with currently existing procedures, and said entities of IMS core, such as an Interrogating Call Session Control Function (hereinafter I-CSCF), a Serving Call Session Control Function (hereinafter S-CSCF) and a Home Subscriber Server (hereinafter HSS), amongst others, are not relevant at this stage for the purpose of the invention. To this end, the P-CSCF 31 is provided with first communication means 311 for communicating with the user and with other entities of the IMS, as FIG. 5 illustrates, thus allowing a user 5 to access the IMS network.

Once the user has been successfully registered in the IMS core 4, the P-CSCF 31, or the AF 3 included therein, as the case may be, receives a successful result during a step S-020 and forwards it during a step S-025 towards the UE 5, as illustrated in FIG. 2.

Then, the P-CSCF 31 may request during a step S-030 from a Policy Control Rules server 1 configuration information for the P-CSCF. This Policy Control Rules server 1 may incorporate all functions of a conventional PCRF or, at least, be responsible for installing control rules to authorize media flows at an entity 2 in the bearer layer, as a conventional PCRF is arranged for. In particular, an AAR message of a Diameter protocol can be used for this purpose including an IP-address for identifying the UE and a session identifier, a so-called session-Id, for identifying the session for the UE in both P-CSCF and Policy Control Rules server, along with an indication of a configuration request.

As already explained above, the P-CSCF 31 may include an AF 3 arranged for communicating with the PCRF or, at least, second communication means 312 for communicating with the Policy Control Rules server 1 responsible for installing control rules to authorize media flows at an entity in the bearer layer. To this end, the P-CSCF 31 includes a configuration requester output 313 for requesting configuration data from the Policy Control Rules server, as FIG. 5 illustrates.

Thus, upon receipt of the configuration request during a step S-030 illustrated in FIG. 2, the Policy Control Rules server 1 may create a so-called registration session. This session can be a new session, or be the AF-registration session that is created nowadays when the AF 3 subscribes itself to notifications from the PCRF, for example, notification of loss of signalling. To this end, the Policy Control Rules server 1 may include first communication means 11 for communicating with the entity in the bearer layer to install control rules therein, such entity being a separate PCEF 2, or a GGSN 21 or PDG 71 both including the PCEF functionality; and second communication means 12 for communicating with the P-CSCF 31, which may include the AF 3, where the UE 5 accesses the IMS offering multimedia services to the user. The Policy Control Rules server 1 may also include for the purpose of the present invention a configuration requester input 122, which may be included in the above second communication means 12 or be provided separately thereof, for receiving the request for configuration data from the P-CSCF 31.

Back to the method illustrated in FIG. 2, the Policy Control Rules server 1 may apply specific policies considering the identity of the terminal, the bearer control mode selected for the IP-CAN session, the characteristics of the IP-CAN type, and a subscriber profile, amongst others, in order to determine the configuration data to be submitted towards the P-CSCF for the user, who is subscriber of the IMS network. To this end, the Policy Control Rules server 1 includes a processor 10, a configuration unit 104 and an internal database 103 likely in cooperation with an external Subscriber Profile Repository 6 (hereinafter SPR).

In an embodiment of the invention the processor 10 of the Policy Control Rules server 1 is adapted for deriving the configuration data to be submitted towards the P-CSCF from at least one element selected from a group of elements that comprises: IP-CAN access type; Bearer Control Mode for the IP-CAN session; Subscriber category; Roaming status; Terminal Type; and Specific operator policies.

Figure 4:
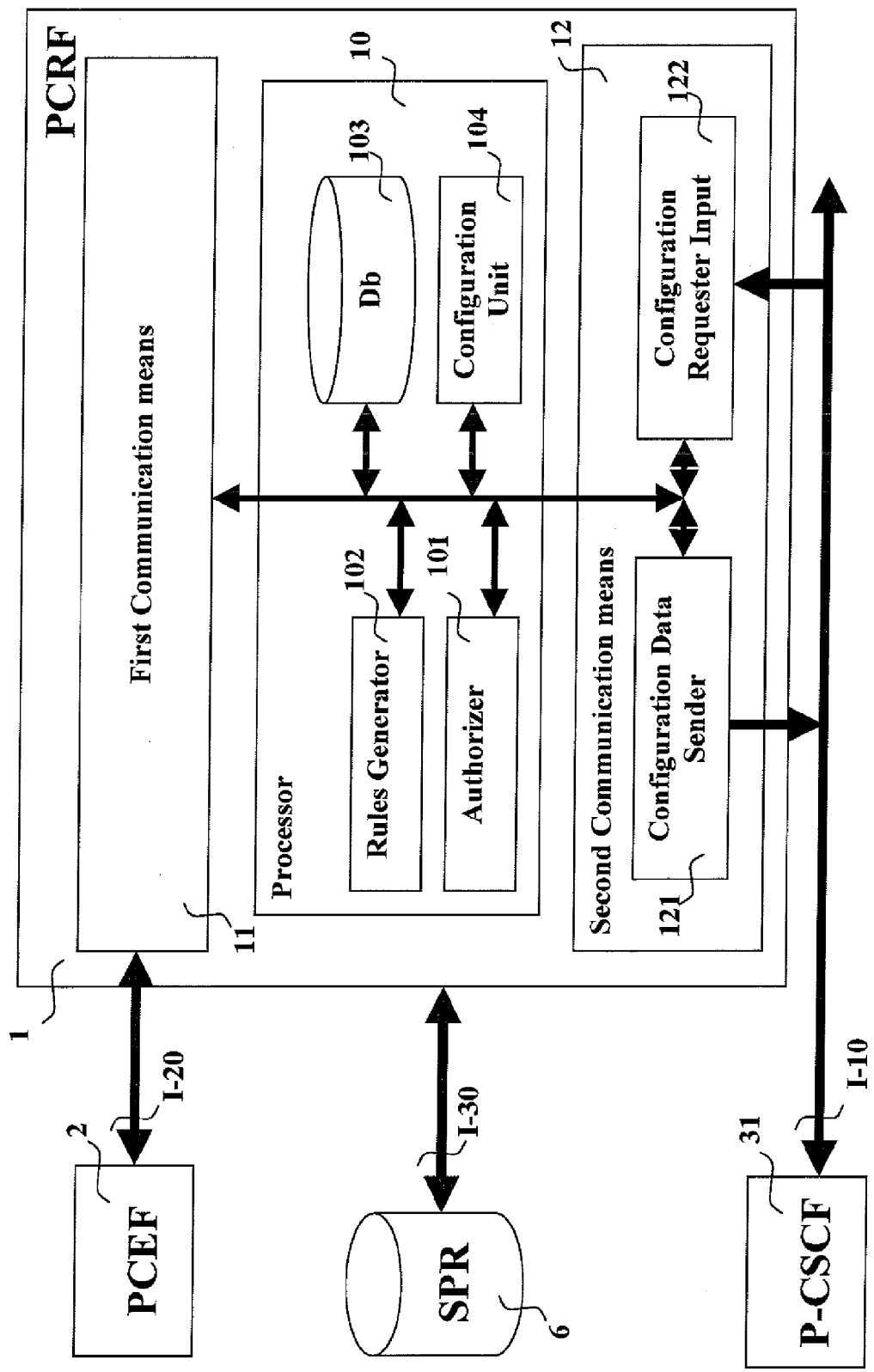
FIG. 4 is a basic block structure presenting the structural elements that a policy control rules server may comprise in accordance with several embodiments of the invention.

Thus, once the configuration data are determined in the Policy Control Rules server 1 by applying specific policies, such configuration data are submitted during a step S-040 towards the P-CSCF, as illustrated in FIG. 2. To this end, the Policy Control Rules server 1 illustrated in FIG. 4 may include a configuration data sender 121 for submitting said configuration data towards the P-CSCF 31. In particular, an AAA message of a Diameter protocol can be used for this purpose.

In accordance with an embodiment of the invention, these configuration data may be selected from a group of configuration data that includes: an indication of a signalling procedure during which a further contact with the Policy Control Rules server is required; an indication to modify or reject service information in transit based on access-related user information; an indication to provide a specific service information element to the Policy Control Rules server usable for policy decisions; and information about access type of an IP connectivity access network "IP-CAN" where the user accesses the IMS through. In an embodiment of the invention, the group of configuration data may include a specific set of policies generated by the Policy Control Rules server based on the type of IP-CAN and likely other user related information, and to be executed by the P-CSCF. The configuration data sender 121 is preferably arranged for submitting these configuration data towards the P-CSCF 31.

More specifically, and in accordance with a nowadays preferred embodiment of the invention, the configuration data may be submitted towards the P-CSCF with help of a new attribute value pair (hereinafter AVP), namely the so-called "Configuration Options", with a format:

Configuration-Options::= < AVP Header xxx>
    [PCC-required]
    [SDP-negotiation]
    [SDP-info]
    [IP-CAN-type]
    [Specific-Policies]

These configuration data, which are hereinafter explained with reference to the above preferred embodiment, may thus provide different combinations of values to allow the P-CSCF to make a distinction as operating on subscriber basis.

The above parameter '[PCC-required]', for instance, may have one out of two preferred values: "SDP-offer" to indicate that P-CSCF may contact the Policy Control Rules server 1 at the reception of both SDP-offer and a SDP-answer; and "SDP-answer" to indicate that the P-CSCF may preferably contact the Policy Control Rules server 1 at reception of a SDP-answer.

The above parameter '[SDP-negotiation]' may have one out of at least three preferred values: "Cancel/Terminate" to indicate that there is no possibility for the P-CSCF to negotiate SDP and, upon detection of problems with SDP the session, the SDP session may be preferably cancelled or terminated; "Reject" to indicate that, where there are not enough resources or the service conditions are not accepted by the Policy Control Rules server 1, P-CSCF 31 may still negotiate new conditions with the terminal; and "Alter" to indicate that, where the service conditions are not accepted by the Policy Control Rules server 1, for example where any of the offered codecs are not allowed for that user, the P-CSCF can alter the SDP offer in progress with a set of allowed SDP parameters.

The above parameter '[SDP-info]' may be of a so-called "Octectstring" type and may include a list of SDP lines that P-CSCF needs to further provide towards the Policy Control Rules server 1 for the given user within a so-called "Codec-Data" AVP. The absence of this AVP indicates the P-CSCF 31 that no extra SDP information is required. This AVP may consist of SDP lines in ASCII encoding separated by new line characters following the format of SDP "a" and "b" lines. For example, the Policy Control Rules server 1 may request the P-CSCF to provide QoS precondition-related information contained in a "a:qos:curr" and "a:qos:des" lines. For example, the P-CSCF may elaborate the "Codec-Data" AVP over a so-called Rx reference point to include SDP lines beyond the actual codec-related information, such as an exemplary codec-related information including a:rtpmap, a:fmtp, a:ptime, a:maxptime SDP lines, and extra SDP lines such as a:gpmd, a:pmft, a:T38MaxBitRate, a:T38FaxRateManagement, a:T38FaxMaxBuffer, a:T38FaxMaxDatagram, b:TIAS a=maxprate, etc.

The above parameter '[IP-CAN-type]' may provide the type of IP-CAN that the user accesses through, and may have one out of at least two preferred values: "GPRS" and "WLAN". The P-CSCF may derive appropriate configuration parameters from this AVP; for example, the P-CSCF may configure itself in order to contact the Policy Control Rules server 1 at "SDP-offer", "Reject" SDP, and provide specific set of SDP lines when IP-CAN type is WLAN. The information about the type of IP-CAN may also allow the P-CSCF to select a set of local policies appropriate for a corresponding access for said type of IP-CAN.

The above parameter '[Specific-Policies]', where included in the group of selectable configuration data, may provide a set of policies to be executed by the P-CSCF while handling subsequent IMS session requests from the particular user. In this respect, the configuration unit 104 cooperates with the processor 10 of the Policy Control Rules server 1 for generating this set of policies based on the type of "IP-CAN" and likely other user related information.

The P-CSCF, upon reception of the configuration data during a step S-040 illustrated in FIG. 2, likely the above Configuration-Options AVP in the AAA message, may be configured accordingly. To this end, the P-CSCF may include a configuration data receiver 314, which may be integrated with the configuration requester output 313 in the second communication means 312, as illustrated in FIG. 5, or be provided as a separate module. This configuration remains operative until the user is deregistered, or the configuration is modified as further explained. To this end, the P-CSCF may be also equipped with a processor 315 for applying the operative configuration data to signalling sessions established by the user, and storage 316 for storing the operative configuration data.

As already explained above, the Policy Control Rules server 1 may apply specific policies in order to determine the configuration data to be submitted towards the P-CSCF for the user. These specific policies may take into consideration, amongst others, conditions such as the identity of the terminal, the bearer control mode selected for the IP-CAN session, the subscriber profile, and combinations thereof. However, these conditions can vary during the lifetime of the registration session. For example, the user might roam to a different IP-CAN during the same IP-CAN session, or the bearer control mode might be modified. Therefore, where one or more conditions vary, the Policy Control Rules server 1 may evaluate specific applicable policies to determine whether the currently applicable configuration data are different than those previously provided to the P-CSCF 31 and, where they have different values, the Policy Control Rules server 1 may submit towards the P-CSCF the currently applicable new configuration data. In particular, a RAR message of a Diameter protocol including a "Configuration-Options" AVP with the currently applicable values can be used for this purpose.

Regarding a session termination, where the currently active IP-CAN session is deleted, the Policy Control Rules server 1 may be notified from an isolated PCEF 2 in the bearer layer, or from a GGSN 21 or PDG 71 including the relevant PCEF functionality, as the case might be. Then, the Policy Control Rules server 1 may request the termination of all the AF-registration sessions by sending, in accordance with an embodiment of the invention, an Abort Session Request (hereinafter ASR) message towards the P-CSCF 31 for each active AF-registration session. Upon receipt of the ASR for to the AF-registration session, the P-CSCF may delete the configuration data associated with said AF-registration session. Likewise, where the P-CSCF 31 is aware that the user has been de-registered, the P-CSCF may terminate the AF-registration session for that user and may delete the configuration data associated with said AF-registration session. To this end, the first communication means 311 in the P-CSCF communicate with the processor 315 to remove from storage 316 corresponding configuration data stored therein.

On the other hand, the provision of SDP-Negotiation capabilities to the P-CSCF may be carried out during a Session Establishment procedure instead of doing so after the Registration procedure, together with the rest of configuration parameters, as proposed in previous embodiments of this invention. To this end, the Policy Control Rules server 1 may provide a "Configuration-Options" AVP with the parameter '[SDP-negotiation]' to appropriately configure the P-CSCF, in particular, with help of an unsuccessful authorization response (hereinafter AAA) message.

The above procedure relates to the establishment of configuration options based on configuration data provided from the Policy Control Rules server 1 towards the P-CSCF 31. Once the P-CSCF is configured, the configuration values are taken into consideration to further manage following SIP sessions. FIG. 3*a*-3*d* show an exemplary use case in which the P-CSCF handles the SIP session taking into consideration those configuration values that the Policy Control Rules server 1 had previously provided during the SIP Registration process. In accordance with this exemplary use case, the P-CSCF has been previously configured in order to:

Contact PCC architecture only at SDP answer;
Provide QoS preconditions in Codec-Data AVP to the Policy Control Rules server;
Terminate the SIP session with a 488 Reject, upon a rejection during the service authorization at the Policy Control Rules server.

In order to provide the above corresponding configuration data, the Policy Control Rules server 1 has taken into account the following data as input criteria:

IP-CAN access type: GPRS;
Bearer Control Mode: Network-initiated mode;
Roaming status: No roaming; and
Terminal Type: multiple-codec support The FIG. 3*a*-3*d* represent a scenario where an originating user, namely UE-A 5*a*, establishes a session towards a destination user, namely UE-B 5*b*, through an originating side, an IMS core, and a destination side, where the IP-CAN is GPRS network. In the originating side the PCEF functionality is provided by an originating GGSN, namely GGSN-A 21*a*; whereas in the destination side the PCEF functionality is provided by a destination GGSN, namely GGSN-B 21*b*. Likewise, the P-CSCF for UE-A accessing the IMS in the originating side is represented by P-CSCF-A 31*a*, whereas the P-CSCF for IMS accessing UE-B in the destination side is represented by P-CSCF-B 31*b*. In particular, the Policy Control Rules server functionality disclosed throughout this specification is carried out under this embodiment by a PCRF of a PCC architecture and is thus represented by PCRF-A 1*a* in the originating side and PCRF-B 1*b* in the destination side. On the other hand, IMS entities of the IMS network at the originating side and at the destination side are all represented by the logical IMS core 4 since no particular entity distinction is relevant for the purpose of the present discussion.

Figure 3A:
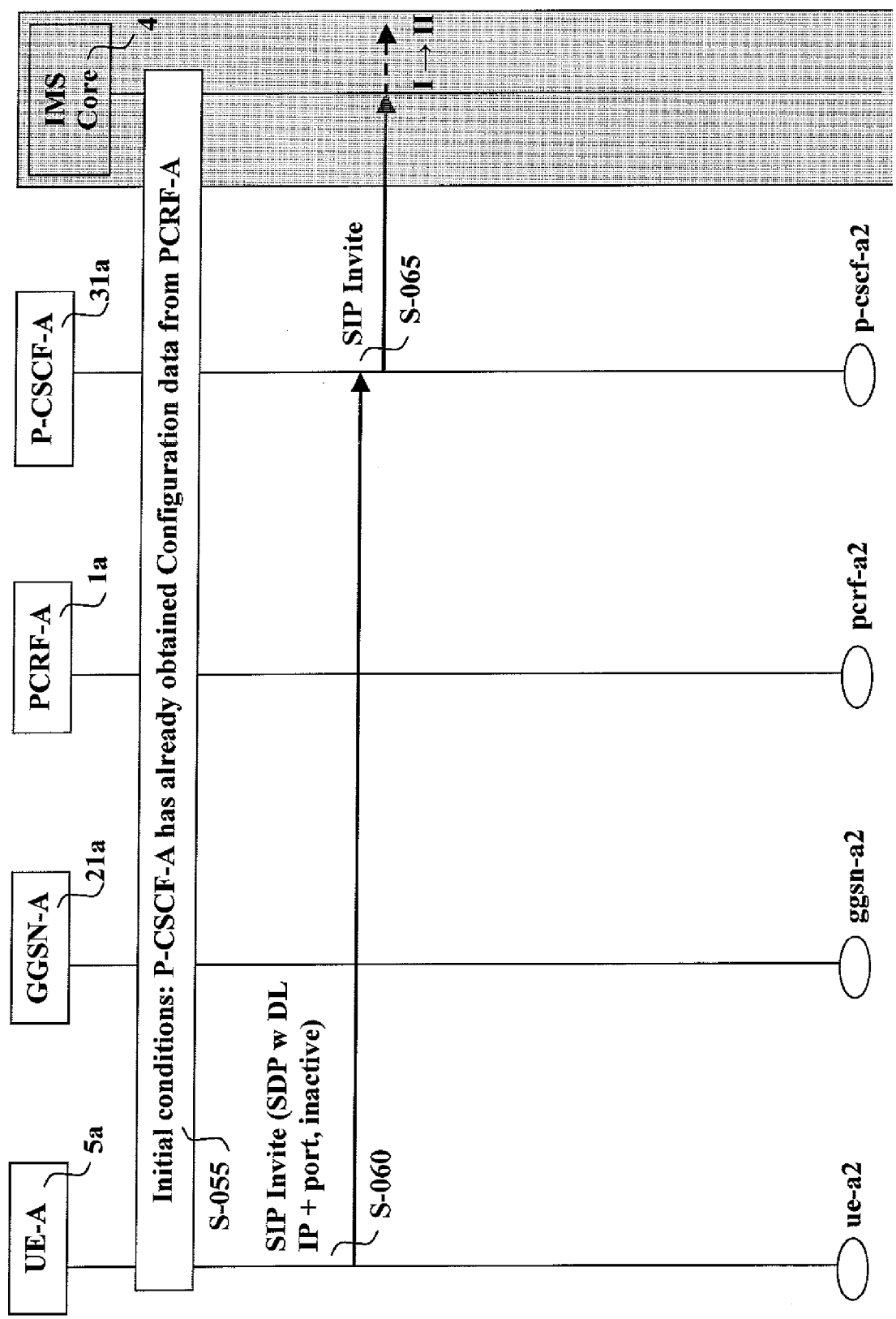
FIGS. 3a, 3b, 3c and 3d illustrate a sequence diagram of an exemplary use obtainable after having completed a dynamic configuration of a P-CSCF to allow an operational distinction based on user categories and access network.

The exemplary use case starts with the sequence of actions illustrated in FIG. 3*a*, where the P-CSCF-A is assumed to have already obtained configuration data from the PCRF-A 1*a* during a Registration procedure that took place at a previous step S-055. At a certain point in time, an originating user UE-A 5*a* wanting to establish an IMS session with a destination user UE-B 5*b*, submits a corresponding invitation towards its P-CSCF-A 31*a* and including an offer Session Description during a step S-060.

Figure 3B:
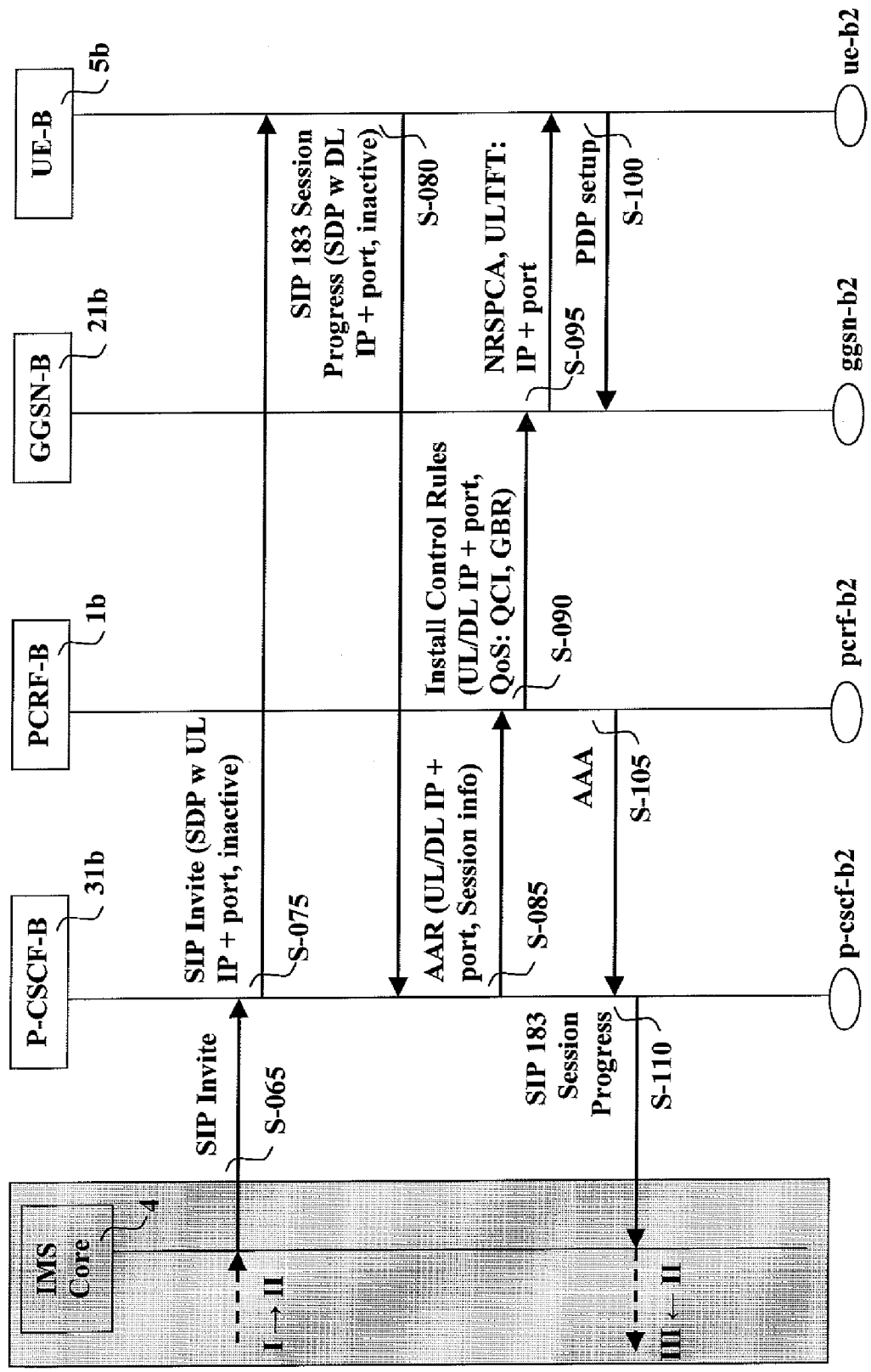

Since the P-CSCF-A had been configured to contact the PCRF-A at reception of an SDP answer, no contact is required yet, and the invitation received in the P-CSCF-A is forwarded from the P-CSCF-A towards the destination side through the IMS core 4, and received in corresponding destination P-CSCF-B 31b as illustrated in FIGS. 3a and 3b, whilst session parameters are negotiated between UE-A and UE-B via an SDP protocol embedded in the SIP signalling. UE-B, then indicates the session progress towards its P-CSCF-B during a step S-080 with notification of relevant SDP negotiation.

As illustrated in FIG. 3b, the P-CSCF-B informs the PCRF-B 1b about it, in particular with an AAR message, and provides corresponding session information during a step S-085. Then, the PCRF-B installs appropriate control rules for the destination side towards the PCEF functionality included in the GGSN-B 21b, which in particular may be PCC rules as provided for PCC corresponding standard specifications, during a step S-090. After having installed the received control rules, the GGSN-B may then coordinate further IP-flows submissions with the UE-B during steps S-095 and S-100. Besides, the PCRF-B confirms back the installation of control rules to the P-CSCF-B 31b, in particular with a corresponding AAA message. The P-CSCF-B receiving such confirmation submits towards the P-CSCF-A 31a at the originating side, during a step S-110 illustrated in FIGS. 3b and 3c and through the IMS core 4, information about the session progress.

With the previously configured input criteria, and likely considering other operator specific criteria such as traffic model, namely delays in the transaction, the operator may have decided that the resource reservation for SIP transactions of this user, may wait until there is an answer that contains capabilities of the terminating side. That is, the P-CSCF-A 31a does not contact the Policy Control Rules server 1a until an SDP answer is received.

The reception of information about the session progress at the P-CSCF-A 31a during the step S-110 may be understood as the expected SDP answer before applying previously received configuration data. Then, the P-CSCF-A 31a submits towards the PCRF-A 1a a corresponding session information along with QoS precondition in a codec data AVP during a step S-115.

The PCRF-A, on its turn, installs appropriate control rules for the originating side towards the PCEF functionality included in the GGSN-A 21a, which in particular may also be PCC rules as provided for PCC corresponding standard specifications, during a step S-120. After having installed the received control rules, the GGSN-A may then coordinate further IP-flows submissions with the UE-A 5a during steps S-125 and S-130. In this exemplary use case for the IMS model, and particularly illustrated in FIG. 3c, the GGSN-A determines needs for rejecting the present session and thus indicates to the PCRF-A during a step S-135. The PCRF-A may inform of such reject to the P-CSCF-A during steps S-140 and S-145, for example, with an ASR or an RAR reject message, which may be acknowledged with a corresponding ASA or RAA message, and likely including information about the rejection cause. In this respect, when the PCRF-A rejects the authorization request operation requested from the P-CSCF-A, for example, because the negotiated codec is not supported, the P-CSCF-A may use any information provided in the rejection message, such as supported codecs, in order to include an appropriate reason code in a SIP reject message to be submitted towards the originating UE-A 5a during a step S-150. The UE-A, which may support several codecs, may then re-initiate a SIP request with new values. Besides, after rejection of the current session, the PCRF-A may uninstall previously applicable control rules.

To this end, a Policy Control Rules server 1 acting as a PCRF of a PCC architecture, in accordance with an embodiment of the present invention, may include a rules generator 102 and an authorizer 101, both likely in cooperation with a storage 103, and may be arranged for submitting the control rules towards the PCEF 2, or instructions to uninstall previous control rules, with help of the first communication means 11.

Figure 3C:
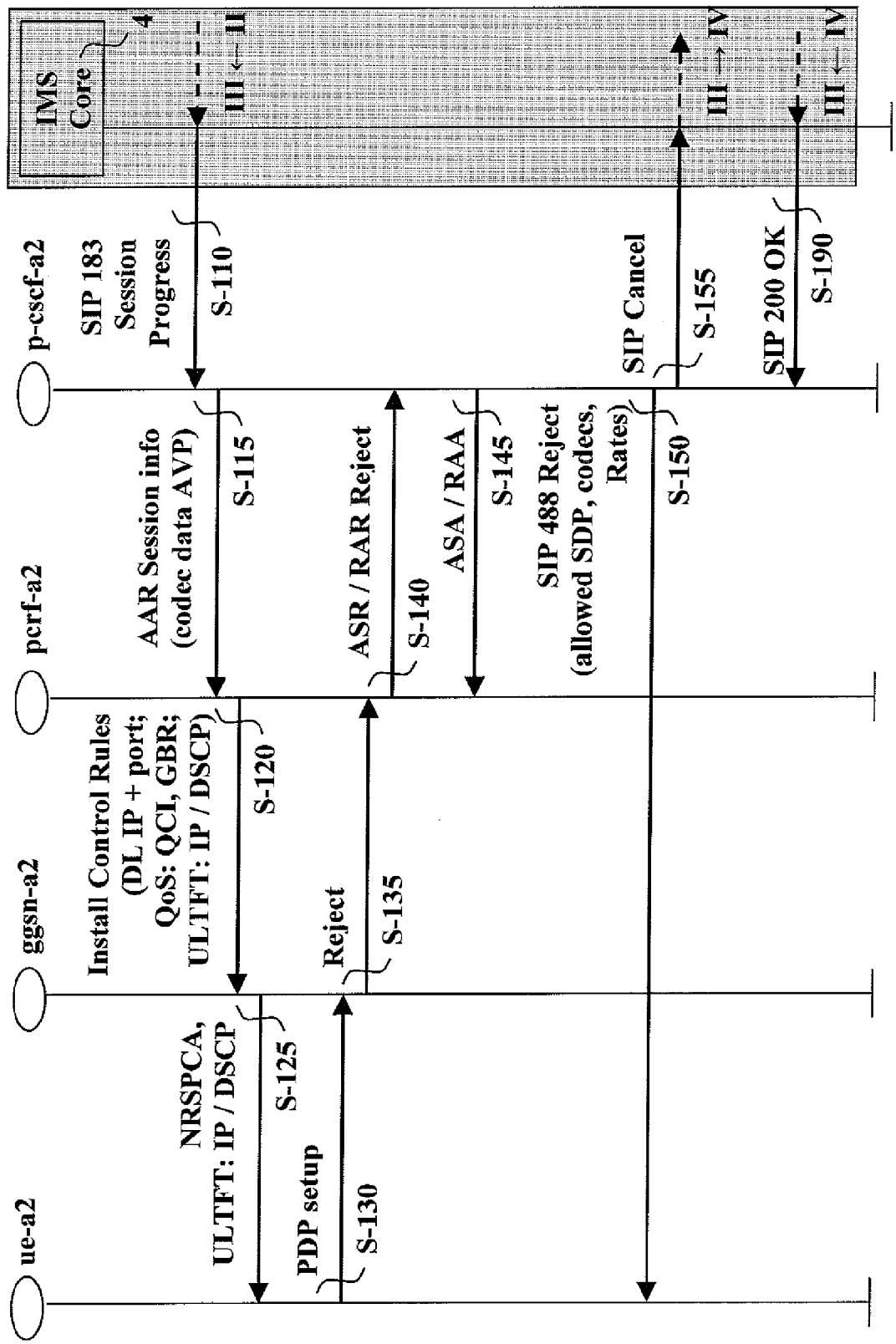
Figure 3D:
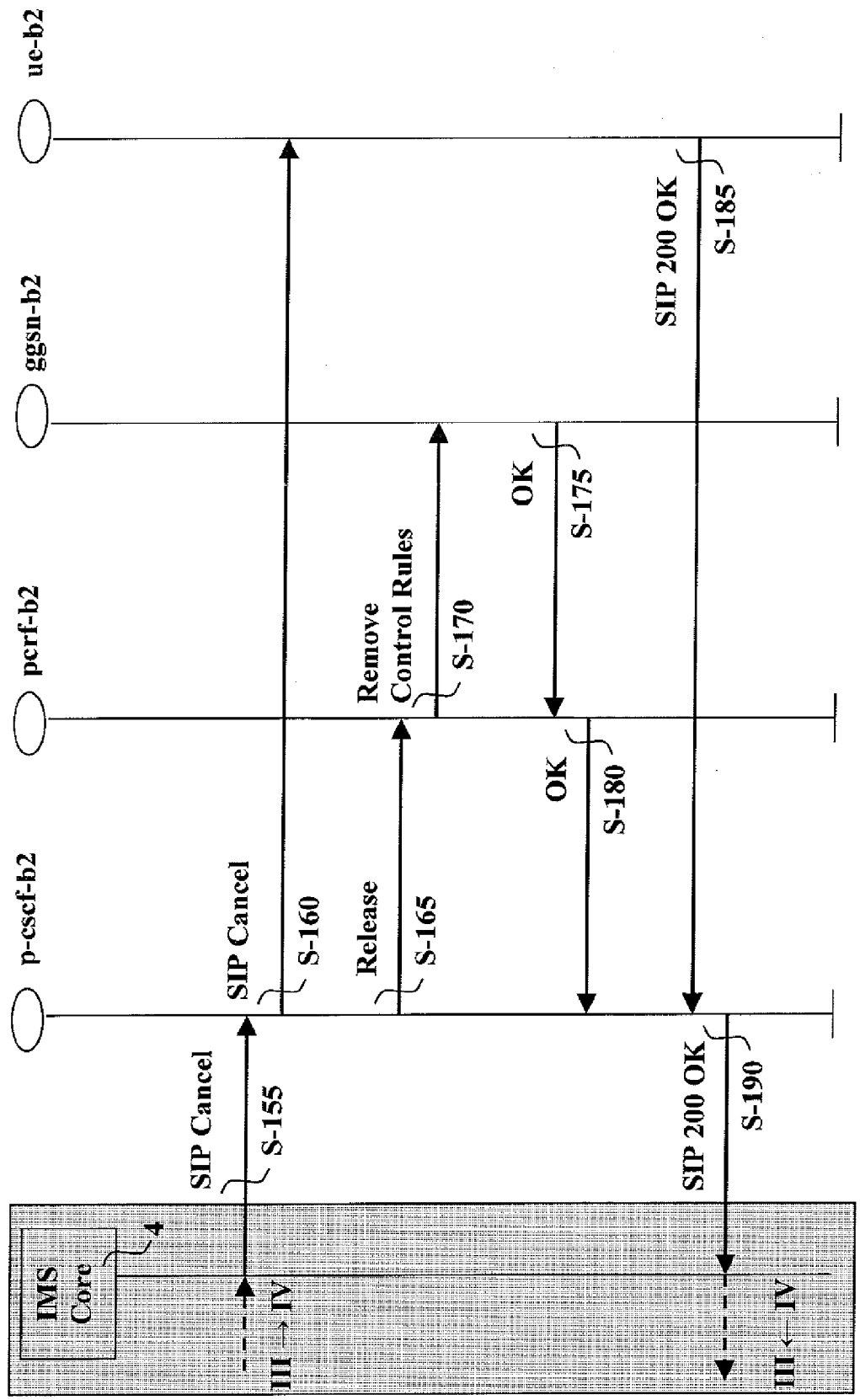

Once the previous session has been rejected during the step S-150 at the originating side, the P-CSCF-A 31a submits during a step S-155 a corresponding cancellation message, as FIGS. 3c and 3d illustrate, towards the destination side via the IMS core 4; for instance, with a SIP Cancel message.

Such cancellation message is received via the IMS core 4 at the P-CSCF-B 31b of the destination side during the step S-155 and forwarded to the destination UE-B 5b in order to terminate the current session, as illustrated in FIG. 3d. Besides, the P-CSCF-B 31b may order a release of the corresponding session towards the PCRF-B 1b during a step S-165. Such a release may trigger an order to remove previously installed control rules, namely uninstalling said control rules, from the PCRF-B towards the GGSN-B during steps S-170 and S-175.

Likely in parallel with this removal of control rules, the destination UE-B may successfully acknowledge towards the destination P-CSCF-B 31b the cancellation of previous session during a step S-185. Such acknowledge is correspondingly forwarded from the receiver destination P-CSCF-B towards the originating side via the IMS core 4 during a step S-190 illustrated in FIGS. 3d and 3c, and received therein at the P-CSCF-A 31a as FIG. 3c illustrates.

In the following, additional explanations are provided for clarification purposes about the circumstances occurred during the handling of a SIP session that may require a decision by a Policy Control Rules server 1 or by a Proxy Call Session Control Function 2 in accordance with aspects of the present invention. Even though some situations are described separately, in most of the cases, they may occur more or less simultaneously or being a consequence of each other. These situations may be resolved based on the values provided by Policy Control Rules server 1 towards the Proxy Call Session Control Function 2 during the SIP Registration process.

For instance, a first situation may be a rejection, cancellation or modification of a SIP session. Thus, when a UE initiates a SIP session, it may indicate different services it can support, namely codec information. The terminating side may provide a response indicating which ones from a list provided by the originating side, are supported. Besides, a further requirement is that the network has appropriate capabilities so that service can be executed in the most optimum way. That is, depending on the selected codec, the network may have to make a different resource reservation. In other words, if the network is not able to reserve the required resources, the P-CSCF may behave in different ways. For instance, if problems with SDP are encountered at reception of an SDP offer, the P-CSCF may either alter the SDP in transit, by including only allowed codecs, and progress the SIP method with the modified SDP offer; or reject the current session indicating allowed SDP information which might be acceptable, namely by including only allowed codecs. On the other hand, if problems with SDP are encountered at reception of an SDP answer, the P-CSCF may cancel or terminate the current session, that is, proceed with the signalling, until receiving a subsequent acknowledgement and then send a SIP CANCEL or a SIP BYE towards the entities involved in such session. Apparently, this alternative is not advantageous for an SDP re-negotiation. Also, where problems with SDP are encountered at reception of an SDP answer, the P-CSCF may alternatively reject the current session indicating the allowed SDP information which would be acceptable, namely by including only allowed codecs.

Regarding interactions operating in accordance with a PCC architecture, and depending on the bearer control mode of operation in the IP-CAN access network, an operator may find more optimal to initiate a resource reservation, namely one of said interactions, during the SIP offer as there is no need to wait for the UE to establish the bearer where the network initiates the bearer establishment, and thus the network may proceed as soon as possible with the resource reservation. Resource shortage situations may be advantageously detected sooner in a process following this approach. On the other hand, depending on the time foreseen for a SIP session establishment and how overloaded the IMS network is, an operator may decide to wait until a destination side successfully responds to a SIP session establishment in order to avoid extra signalling. Additionally, those procedures operating in accordance with a PCC architecture may be executed only at reception of an SDP answer, thus contributing to reduce the risk for race conditions, such as ghost ringing or media clipping, for example.

Regarding the provision of IP-CAN access information to the IMS network, 3GPP assumes the support of multiple access networks. The IMS network can use this information about the access network, namely IP-CAN access information, to handle the IMS session in a different way. For example, the kind of information that needs to be provided to the PCRF may be different, or the P-CSCF might have to wait in order to know whether the resource reservation has occurred successfully before continuing with the SIP session. At present, IMS networks already receive access network information from the UE. However, this information is not a reliable solution since it is up to the terminal to provide or not the adequate information. On the other hand, a PCC architecture is aware of the IP-CAN in use by the subscriber and, therefore, such IP-CAN may be provided to the P-CSCF via the Policy Control Rules server 1, which in accordance with an aspect of the present invention may be a PCRF of a PCC architecture.

Regarding SDP data provisions to this Policy Control Rules server 1, there are initiatives like Packet Cable, which is a forum for developing IMS services over fixed networks, that require the PCC architecture to consider specific SDP information in the policy evaluation for QoS and charging decisions. However, this sort of information may be irrelevant for a traditional 3GPP IMS architecture. For this purpose, a Proxy Call Session Control Function 31 may, in accordance with an aspect of the present invention, elaborate a so-called codec-data AVP in order to include SDP lines beyond the actual codec related information, as the exemplary a:rtpmap, a:fmtp, a:ptime, a:maxptime SDP lines, and may also include extra SDP lines such as a:gpmd, a:pmft, a:T38MaxBitrate, a:T38FaxRateManagement, a:T38FaxMaxBuffer, a:T38FaxMaxDatagram, etc.

Also in considering the provision of IP-CAN access information as described above for a decision making process, a Proxy Call Session Control Function 31 may be arranged to be configured, in accordance with an aspect of the invention, with knowledge about information that should preferably be provided to the Policy Control Rules server 1 depending of the access network that the user is accessing from, what is advantageously useful for serving users who access from different types of IP-CAN.

This invention thus allows an operator of an IMS network to efficiently handle the network; to configure the network on a per user and/or per session basis, by adapting the configuration to operator preferences, performance, kind of user, bearer control mode of operation, etc; and to manage different kind of IMS networks, with different exigencies, such as Packet Cable, conventional 3GPP IMS networks, etc.

The invention may be practiced by a computer program, loadable into an internal memory of a computer with input and output units as well as with a processing unit, the computer program comprising executable software adapted to carry out method steps as described above when running in the computer, and wherein the executable software may be recorded in a carrier readable in a computer.

The invention is described above in respect of several embodiments in an illustrative and non-restrictive manner. Obviously, variations, and combinations of these embodiments are possible in light of the above teachings, and any modification of the embodiments that fall within the scope of the claims is intended to be included therein.

The invention claimed is:

1. A Proxy Call Session Control Function (P-CSCF) server for enabling multiple users to access, through one or more types of IP connectivity access network (IP-CAN), an IP Multimedia Subsystem (IMS) offering multimedia services to the users, wherein the P-CSCF server is configured to perform the following for each user and access type:
   receive a registration request from a user having a signaling session established through an IP-CAN with the P-CSCF server, the registration request requesting to access the IMS;
   send to a Policy Control Rules server, a configuration request for P-CSCF configuration data to configure the P-CSCF server, said configuration request including information identifying the user;
   receive from the Policy Control Rules server, the P-CSCF configuration data, the P-CSCF configuration data being dynamically selected by the Policy Control Rules server and including:
      one or more instructions to modify or reject service information in transit between the user and the IMS based on access-related user information; and
      information about an access type of the IP-CAN through which the user has established the signaling session with the P-CSCF server;
   configure the P-CSCF server in accordance with the dynamically selected P-CSCF configuration data; and
   modify or reject service information in transit between the user and the IMS based on the received information about the access type of the IP-CAN.

2. The P-CSCF server of claim 1, further configured to perform the following:
   store the received P-CSCF configuration data for each user; and
   delete the received P-CSCF configuration data from storage once each user becomes unregistered.

3. The P-CSCF server of claim 1, further configured to support a Session Initiation Protocol (SIP) for initiating and signaling multimedia sessions established by each user with the IMS, and a Session Description Protocol (SDP) to receive, during an SDP session, information about media flows associated with the multimedia sessions.

4. The P-CSCF server of claim 3, wherein the one or more instructions to modify or reject service information in transit based on access-related user information are provided with a parameter "SDP-negotiation" in an attribute value pair (AVP), the parameter selected from a group of values that includes: "Cancel/Terminate" to indicate no negotiation of SDP and, upon detection of problems, an SDP session to be cancelled or terminated; "Reject" to indicate negotiation of new conditions with a user equipment, where there are not enough resources or where service conditions are not acceptable by the Policy Control Rules server; and "Alter" to indicate alteration of an SDP offer in progress with a set of allowed SDP parameters, where the service conditions are not acceptable by the Policy Control Rules server.

5. The P-CSCF server of claim 3, wherein the information about the access type of each IP-CAN is provided with a parameter "IP-CAN-type" in an attribute value pair (AVP), the parameter selected from a group of values that includes: "GPRS" and "WLAN".

6. The P-CSCF server of claim 1, wherein the P-CSCF configuration data further includes one or more of the following:
an indication of a signaling procedure during which a further contact with the Policy Control Rules server is required; and
an indication to provide a specific service information element to the Policy Control Rules server usable for policy decisions.

7. The P-CSCF server of claim 6, further configured to support a Session Initiation Protocol (SIP) for initiating and signaling multimedia sessions established by each user with the IMS, and a Session Description Protocol (SDP) to receive, during an SDP session, information about media flows associated with the multimedia sessions;
wherein the indication of a signaling procedure to further contact with the Policy Control Rules server is provided with a parameter "PCC-required" in an attribute value pair (AVP), the parameter selected from a group of values that includes "SDP-offer" to indicate a contact at reception of both an SDP-offer and an SDP-answer, and "SDP-answer" to indicate a contact at reception of an SDP-answer.

8. The P-CSCF server of claim 6, further configured to support a Session Initiation Protocol (SIP) for initiating and signaling multimedia sessions established by each user with the IMS, and a Session Description Protocol (SDP) to receive, during an SDP session, information about media flows associated with the multimedia sessions;
wherein the indication to provide a specific service information element to the Policy Control Rules server usable for policy decisions is provided with a parameter "SDP-info" in an attribute value pair (AVP), the parameter value including a list of SDP lines to be further provided towards the Policy Control Rules server for a given user within a "Codec-Data" AVP.

9. A Policy Control Rules server responsible for installing control rules to authorize media flows at an entity in a bearer layer, wherein the Policy Control Rules server communicates with a Proxy Call Session Control Function (P-CSCF) server that enables multiple users to access, through one or more types of IP connectivity access network (IP-CAN), an IP Multimedia Subsystem (IMS) offering multimedia services to the users, wherein the Policy Control Rules server receives configuration requests from the P-CSCF server and is configured to perform the following for each configuration request received from the P-CSCF server:
receive from the P-CSCF server, a configuration request for P-CSCF configuration data to configure the P-CSCF server for a user to access the IMS, the configuration request including information identifying the user;
determine appropriate P-CSCF configuration data based on at least one of: an IP-CAN access type for the user; Bearer Control Mode for an IP-CAN session for the user; a terminal type for the user; and specific operator policies for the user;
send the P-CSCF configuration data to the P-CSCF server, said P-CSCF configuration data including:
one or more instructions to modify or reject service information in transit between the user and the IMS based on access-related user information; and
information about the access type of the user's IP-CAN.

10. The Policy Control Rules server of claim 9, wherein the information about the access type of the IP-CAN, sent to the P-CSCF server, is provided with a parameter "IP-CAN-type" in an attribute value pair (AVP), the parameter selected from a group of values that includes: "GPRS" and "WLAN".

11. The Policy Control Rules server of claim 9, further configured to perform the following: generate control rules to be installed at the entity in the bearer layer; and authorize a session towards the P-CSCF server.

12. The Policy Control Rules server of claim 11, wherein the entity in the bearer layer includes a Policing and Charging Enforcement Point, and the Policy Control Rules server is configured to install the control rules, or instructions to uninstall previously installed control rules.

13. The Policy Control Rules server of claim 9, wherein the P-CSCF configuration data further includes one or more of the following:
an indication of a signaling procedure during which a further contact with the Policy Control Rules server is required; and
an indication to provide a specific service information element to the Policy Control Rules server usable for policy decisions.

14. The Policy Control Rules server of claim 13, wherein the indication of a signaling procedure to further contact the Policy Control Rules server, sent to the P-CSCF server, is provided with a parameter value in an attribute value pair (AVP), the parameter value selected from a group of values that includes an indication to contact at reception of both a Session Description Protocol (SDP) offer and a Session Description Protocol (SDP) answer; and an indication to contact at reception of a Session Description Protocol (SDP) answer.

15. The Policy Control Rules server of claim 13, wherein the one or more instructions to modify or reject service information, sent to the P-CSCF server, is provided with a parameter value in an attribute value pair (AVP), the parameter value selected from a group of values that includes: "Cancel/Terminate" to indicate no negotiation of Session Description Protocol (SDP) and, upon detection of problems, an SDP session to be cancelled or terminated; "Reject" to indicate negotiation of new conditions with a user equipment, where there are not enough resources or where service conditions are not acceptable by the Policy Control Rules server; and "Alter" to indicate alteration of an SDP offer in progress with a set of allowed SDP parameters, where the service conditions are not acceptable by the Policy Control Rules server.

16. The Policy Control Rules server of claim 13, wherein the indication to provide a specific service information element to the Policy Control Rules server usable for policy decisions, sent to the P-CSCF server, is provided with a parameter value in an attribute value pair (AVP), the parameter value including a list of Session Description Protocol (SDP) lines to be further provided towards the Policy Control Rules server for a given user within a "Codec-Data" AVP.

17. A method for dynamically configuring a Proxy Call Session Control Function (P-CSCF) server using a Policy Control Rules server, the P-CSCF server enabling multiple users to access, through one or more types of IP connectivity access network (IP-CAN), an IP Multimedia Subsystem (IMS), the Policy Control Rules server being responsible for installing control rules to authorize media flows at an entity in a bearer layer, the method comprising performing the following steps for each user and access type:

receiving, by the P-CSCF server, a registration request from a user being one of said multiple users that has a signaling session established with the P-CSCF server through an IP-CAN, the registration request requesting to access the IMS;

sending from the P-CSCF server to a Policy Control Rules server, a configuration request for P-CSCF configuration data to configure the P-CSCF server, the configuration request including information identifying the user;

determining at the Policy Control Rules server, appropriate P-CSCF configuration data based on at least one of: an IP-CAN access type for the user, Bearer Control Mode for an IP-CAN session for the user, a terminal type for the user, and specific operator policies for the user;

sending from the Policy Control Rules server and receiving at the P-CSCF server, the P-CSCF configuration data including:

one or more instructions to modify or reject service information in transit between the user and the IMS based on access-related user information; and information about an access type of the IP-CAN through which the user has established the signaling session with the P-CSCF server;

configuring the P-CSCF server in accordance with the received P-CSCF configuration data; and modifying or rejecting, by the P-CSCF server, service information in transit between the user and the IMS based on the received information about the access type of the IP-CAN through which the user has established the signaling session with the P-CSCF server.

18. The method of claim 17, wherein a Session Initiation Protocol (SIP) is used for initiating and signaling multimedia sessions established by each user with the IMS, and a Session Description Protocol (SDP) is used to receive, during an SDP session, information about media flows associated with the multimedia sessions.

19. The method of claim 18, wherein the one or more instructions to modify or reject the service information sent to the P-CSCF server, is provided with a parameter value in an attribute value pair (AVP), the parameter value selected from a group of values that includes: "Cancel/Terminate" to indicate no negotiation of SDP and, upon detection of problems, the SDP session to be cancelled or terminated; "Reject" to indicate negotiation of new conditions with a user equipment, where there are not enough resources or where service conditions are not acceptable by the Policy Control Rules server; and "Alter" to indicate alteration of an SDP offer in progress with a set of allowed SDP parameters, where the service conditions are not acceptable by the Policy Control Rules server.

20. The method of claim 18, wherein the information about the access type of the IP connectivity access network (IP-CAN) through which the user has established the signaling session with the P-CSCF server, sent to the P-CSCF server, is provided with a parameter "IP-CAN-type" in an attribute value pair (AVP), the parameter value selected from a group of values that includes: "GPRS" and "WLAN".

21. The method of claim 17, further comprising generating the control rules at the Policy Control Rules server to be installed at the entity in the bearer layer, and authorizing, by the Policy Control Rules server, a session towards the P-CSCF server.

22. The method of claim 17, wherein the P-CSCF configuration data further includes one or more of the following:

an indication of a signaling procedure during which a further contact with the Policy Control Rules server is required; and an indication to provide a specific service information element to the Policy Control Rules server usable for policy decisions.

23. The method of claim 22, wherein a Session Initiation Protocol (SIP) is used for initiating and signaling multimedia sessions established by each user with the IMS, and a Session Description Protocol (SDP) is used to receive, during an SDP session, information about media flows associated with the multimedia sessions;

wherein the indication of a signaling procedure to further contact the Policy Control Rules server, sent to the P-CSCF server, is provided with a parameter value in an attribute value pair (AVP), the parameter value selected from a group of values that includes "SDP-offer" to indicate a contact at reception of both an SDP-offer and an SDP-answer; and "SDP-answer" to indicate a contact at reception of an SDP-answer.

24. The method of claim 22, wherein a Session Initiation Protocol (SIP) is used for initiating and signaling multimedia sessions established by each user with the IMS, and a Session Description Protocol (SDP) is used to receive, during an SDP session, information about media flows associated with the multimedia sessions;

wherein the indication to provide a specific service information element to the Policy Control Rules server usable for policy decisions, sent to the P-CSCF server, is provided with a parameter value in an attribute value pair (AVP), the parameter value including a list of SDP lines to be further provided towards the Policy Control Rules server for a given user within a "Codec-Data" AVP.

\* \* \* \* \*